US012720590B2

(12) United States Patent
Mu

(10) Patent No.: US 12,720,590 B2
(45) Date of Patent: Aug. 25, 2026

(54) METHOD FOR CONFIGURING CANDIDATE NUMBER OF REPEATED TRANSMISSIONS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 496 days.

(21) Appl. No.: 18/266,183

(22) PCT Filed: Dec. 11, 2020

(86) PCT No.: PCT/CN2020/135941
§ 371 (c)(1),
(2) Date: Jun. 8, 2023

(87) PCT Pub. No.: WO2022/120847
PCT Pub. Date: Jun. 16, 2022

(65) Prior Publication Data
US 2024/0049276 A1 Feb. 8, 2024

(51) Int. Cl.
*H04W 74/00* (2009.01)
*H04W 74/08* (2024.01)
*H04W 74/0833* (2024.01)

(52) U.S. Cl.
CPC ..... *H04W 74/002* (2013.01); *H04W 74/0833* (2013.01)

(58) Field of Classification Search
CPC ....... H04L 1/08; H04L 1/1896; H04L 5/0057; H04L 5/0091; H04W 74/002; H04W 74/0833
See application file for complete search history.

(56) References Cited

U.S. PATENT DOCUMENTS 9,674,710 B2 * 6/2017 Chen ..................... H04L 5/0044
11,533,760 B2 * 12/2022 Wong ................ H04W 72/0446
2014/0098761 A1 4/2014 Lee et al.
2016/0227580 A1 * 8/2016 Xiong .................. H04W 8/005
(Continued)

FOREIGN PATENT DOCUMENTS

CN 104184548 A 12/2014
CN 104349458 A 2/2015
(Continued)

OTHER PUBLICATIONS

Chinese Patent Application No. 2020800038623 First Office Action dated Dec. 20, 2024 with English translation, 21 pages.
(Continued)

*Primary Examiner* — Liton Miah
(74) *Attorney, Agent, or Firm* — Cozen O'Connor

(57) ABSTRACT

A method for configuring a candidate number of repetitions, performed by a base station, including: obtaining a configuration parameter set related to candidate numbers of repetitions predefined in a specification or notified by a broadcasting channel, wherein the configuration parameter set related to candidate numbers of repetitions comprises at least one set of candidate numbers of repetitions, and the set of candidate numbers of repetitions is used to determine a number of repetitions of at least one random access channel.

14 Claims, 4 Drawing Sheets

S501 obtaining a configuration parameter set related to candidate numbers of repetitions predefined in a specification or notified by a broadcasting channel, the configuration parameter set related to candidate numbers of repetitions includes at least one set of candidate numbers of repetitions, the set of candidate numbers of repetitions is used to determine a number of repetitions of at least one random access channel, and the configuration parameter set related to candidate numbers of repetitions includes a correspondence relation between the set of candidate numbers of repetitions and at least one of a user terminal type and a channel type

(56) References Cited

U.S. PATENT DOCUMENTS

| | | | | |
|---|---|---|---|---|
| 2017/0230840 | A1* | 8/2017 | Chen | H04B 7/0697 |
| 2021/0051707 | A1* | 2/2021 | Rastegardoost | H04W 74/006 |
| 2022/0132590 | A1* | 4/2022 | Chen | H04W 74/0833 |
| 2023/0015843 | A1* | 1/2023 | Li | H04W 74/0891 |

FOREIGN PATENT DOCUMENTS

| | | | |
|---|---|---|---|
| CN | 104349476 | A | 2/2015 |
| CN | 106301671 | A | 1/2017 |
| CN | 108476539 | A | 8/2018 |
| CN | 110915157 | A | 3/2020 |
| WO | WO 2019200519 | A1 | 10/2019 |

OTHER PUBLICATIONS

PCT/CN2020/135941, English translation of International Search Report dated Sep. 6, 2021, 2 pages.
European Patent Application No. 20964783.3, Search and Opinion Dec. 22, 2023, 8 pages.
Chinese Patent Application No. 202080003862.3, Office Action with English translation dated May 30, 2025, 30 pages.

* cited by examiner

S101 determining a configuration parameter set related to candidate numbers of repetitions, the configuration parameter set related to candidate numbers of repetitions includes at least one set of candidate numbers of repetitions, and the set of candidate numbers of repetitions is used to determine a parameter related to a number of repetitions of at least one random access channel

FIG. 1

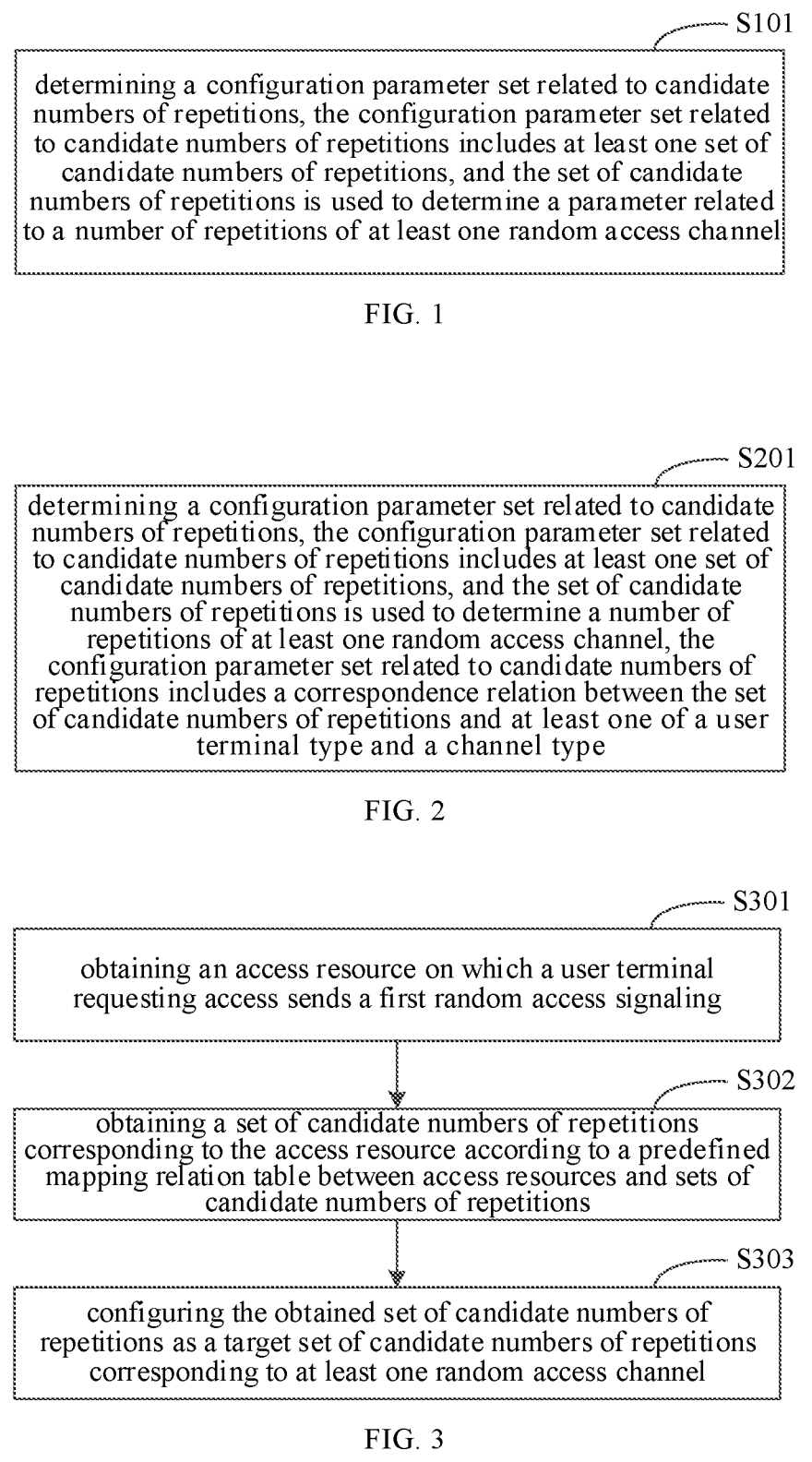

S201 determining a configuration parameter set related to candidate numbers of repetitions, the configuration parameter set related to candidate numbers of repetitions includes at least one set of candidate numbers of repetitions, and the set of candidate numbers of repetitions is used to determine a number of repetitions of at least one random access channel, the configuration parameter set related to candidate numbers of repetitions includes a correspondence relation between the set of candidate numbers of repetitions and at least one of a user terminal type and a channel type

FIG. 2

S301 obtaining an access resource on which a user terminal requesting access sends a first random access signaling

S302 obtaining a set of candidate numbers of repetitions corresponding to the access resource according to a predefined mapping relation table between access resources and sets of candidate numbers of repetitions

S303 configuring the obtained set of candidate numbers of repetitions as a target set of candidate numbers of repetitions corresponding to at least one random access channel

FIG. 3

S401 determining a configuration parameter set related to candidate numbers of repetitions, the configuration parameter set related to candidate numbers of repetitions includes at least one set of candidate numbers of repetitions, and the set of candidate numbers of repetitions is used to determine a number of repetitions of at least one random access channel

FIG. 4

S501 obtaining a configuration parameter set related to candidate numbers of repetitions predefined in a specification or notified by a broadcasting channel, the configuration parameter set related to candidate numbers of repetitions includes at least one set of candidate numbers of repetitions, the set of candidate numbers of repetitions is used to determine a number of repetitions of at least one random access channel, and the configuration parameter set related to candidate numbers of repetitions includes a correspondence relation between the set of candidate numbers of repetitions and at least one of a user terminal type and a channel type

FIG. 5

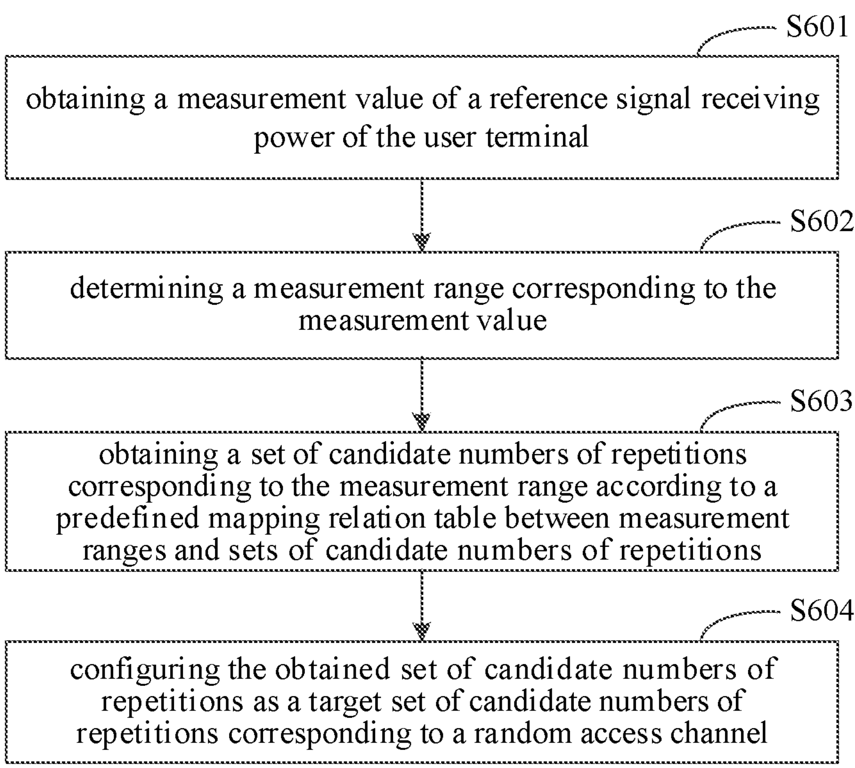

FIG. 6

Memory
1200
Bus
Input device
1300
Output device
1400
processor
1100

METHOD FOR CONFIGURING CANDIDATE NUMBER OF REPEATED TRANSMISSIONS

CROSS-REFERENCE TO RELATED APPLICATION

This application is a U.S. national phase of International Application No. PCT/CN2020/135941, filed on Dec. 11, 2020, the entire content of which is incorporated herein by reference.

TECHNICAL FIELD

The embodiments of the disclosure relate to the field of mobile communication, in particular to a method for configuring a candidate number of repetitions.

BACKGROUND

In related art, with the continuous development of Internet of Things (IoT) services, such as video surveillance, smart homes, wearable devices, and industrial sensor detection, these IoT services have high requirements for transmission rate and delay. In order to adapt to the high requirements of the IoT services for transmission rate and delay, a base station needs to perform coverage enhancement on user terminals. Currently, a retransmission method is mostly adopted for the coverage enhancement.

SUMMARY

According to embodiments of a first aspect of the disclosure, a method for configuring a candidate number of repetitions, performed by a base station, is provided. The method includes: obtaining a configuration parameter set related to candidate numbers of repetitions predefined in a specification or notified by a broadcasting channel, in which the configuration parameter set related to candidate numbers of repetitions includes at least one set of candidate numbers of repetitions, and the set of candidate numbers of repetitions is used to determine a number of repetitions of at least one random access channel.

According to embodiments of a second aspect of the disclosure, a method for configuring a candidate number of repetitions, performed by a base station, is provided. The method includes: obtaining an access resource on which a user terminal requesting access sends a first random access signaling; obtaining a set of candidate numbers of repetitions corresponding to the access resource according to a predefined mapping relation table between access resources and sets of candidate numbers of repetitions; and configuring the set of candidate numbers of repetitions obtained as a target set of candidate numbers of repetitions corresponding to at least one random access channel.

According to embodiments of a third aspect of the disclosure, a method for configuring a candidate number of repetitions, performed by a user terminal, is provided. The method includes: obtaining a configuration parameter set related to candidate numbers of repetitions predefined in a specification or notified by a broadcasting channel, the configuration parameter set related to candidate numbers of repetitions includes at least one set of candidate numbers of repetitions, and the set of candidate numbers of repetitions is used to determine a number of repetitions of at least one random access channel.

According to embodiments of a fourth aspect of the disclosure, a method for configuring a candidate number of repetitions, performed by a user terminal, is provided. The method includes: obtaining a measurement value of a reference signal receiving power of the user terminal; determining a measurement range corresponding to the measurement value; obtaining a set of candidate numbers of repetitions corresponding to the measurement range according to a predefined mapping relation table between measurement ranges and sets of candidate numbers of repetitions; and configuring the set of candidate numbers of repetitions obtained as a target set of candidate numbers of repetitions corresponding to a random access channel.

According to a fifth aspect of the disclosure, an electronic device is provided. The electronic device includes at least one processor; and a memory communicatively connected to the at least one processor. The memory has instructions executable by the at least one processor stored thereon that, when executed by the at least one processor, cause the at least one processor to be capable to perform the method for configuring a candidate number of repetitions according to embodiments of the first aspect of the disclosure, the method for configuring a candidate number of repetitions according to embodiments of the second aspect of the disclosure, the method for configuring a candidate number of repetitions according to embodiments of the third aspect of the disclosure, or the method for configuring a candidate number of repetitions according to embodiments of the fourth aspect of the disclosure.

According to a sixth aspect of the disclosure, a computer-readable storage medium having computer instructions stored thereon is provided. The computer instructions are configured to cause a computer to perform the method for configuring a candidate number of repetitions according to embodiments of the first aspect of the disclosure, the method for configuring a candidate number of repetitions according to embodiments of the second aspect of the disclosure, the method for configuring a candidate number of repetitions according to embodiments of the third aspect of the disclosure, or the method for configuring a candidate number of repetitions according to embodiments of the fourth aspect of the disclosure.

Additional aspects and advantages of the disclosure will be given in part in the following descriptions, become apparent in part from the following descriptions, or be learned through the practice of the disclosure.

BRIEF DESCRIPTION OF THE DRAWINGS

The above and/or additional aspects and advantages of the disclosure will become apparent and readily appreciated from the following descriptions made with reference to the drawings, in which:

FIG. 1 is a flowchart of a method for configuring a candidate number of repetitions performed by a base station according to an embodiment of the disclosure.

FIG. 2 is a flowchart of a method for configuring a candidate number of repetitions performed by a base station according to another embodiment of the disclosure.

FIG. 3 is a flowchart of a method for configuring a candidate number of repetitions performed by a base station according to another embodiment of the disclosure.

FIG. 4 is a flowchart of a method for configuring a candidate number of repetitions performed by a user terminal according to another embodiment of the disclosure.

FIG. 5 is a flowchart of a method for configuring a candidate number of repetitions performed by a user terminal according to another embodiment of the disclosure.

FIG. 6 is a flowchart of a method for configuring a candidate number of repetitions performed by a user terminal according to another embodiment of the disclosure.

DETAILED DESCRIPTION

Figure 7:
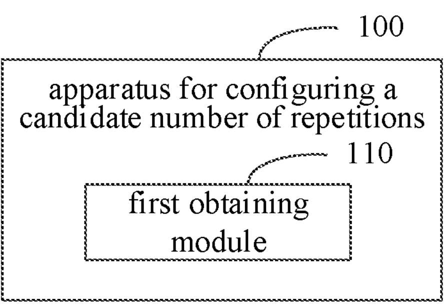
FIG. 7 is a block diagram of an apparatus for configuring a candidate number of repetitions according to an embodiment of the disclosure.

Reference will be made in detail to embodiments of the disclosure. Examples of the embodiments are illustrated in accompanying drawings, in which the same or similar elements and the elements having same or similar functions are denoted by same or similar reference numerals throughout the descriptions. The embodiments described with reference to the drawings are explanatory, intended to interpret the disclosure, and are not to be construed as a limitation of the disclosure.

A specific description of a base station (BS) and a user terminal involved in the embodiments of the disclosure is as follows. The base station is deployed in a wireless access network to provide a wireless access function for the user terminal. The base station can wirelessly communicate with the user terminal through one or more antennas. The base station can provide a communication coverage for its geographical area. The base station can include different types such as a macro base station, a micro base station, a relay station, an access point, etc. In some embodiments, the base station may be referred to by those skilled in the art as a base station transceiver, a wireless base station, an access point, a wireless transceiver, a Basic Service Set (BSS), an Extended Service Set (ESS), a Node B (NodeB), an Evolved NodeB (eNB or eNodeB), or other appropriate terminology. For example, in a 5G system, the base station is referred to as gNB. For the convenience of description, in the embodiments of the disclosure, the above devices that provide wireless communication functions for the user terminal are collectively referred to as base stations.

User terminals can be dispersed throughout the entire mobile communication system, and each user terminal can be stationary or mobile. The user terminal can also be referred to as a mobile station, a user station, a mobile unit, a user unit, a wireless unit, a remote unit, a mobile device, a terminal device, a wireless device, a wireless communication device, a remote device, a mobile user station, an access user device, a mobile user device, a wireless user device, a remote user device, a handheld device, a user agent, a mobile client, a client, or some other appropriate terminology by those skilled in the art. The user terminal can be a cellular phone, a personal digital assistant (PDA), a wireless modem, a wireless communication device, a handheld device, a tablet computer, a laptop computer, a cordless telephone, a wireless local loop (WLL) station, etc., and can communicate with the base station in the mobile communication system.

FIG. 1 is a flowchart of a method for configuring a candidate number of repetitions according to an embodiment of the disclosure. The method is performed by a base station. As illustrated in FIG. 1, the method for configuring a candidate number of repetitions includes following steps.

S101, a configuration parameter set related to candidate numbers of repetitions is determined, the configuration parameter set related to candidate numbers of repetitions includes at least one set of candidate numbers of repetitions, and the set of candidate numbers of repetitions is used to determine a parameter related to a number of repetitions of at least one random access channel.

In an embodiment of the disclosure, there may be many methods for determining the configuration parameter set related to candidate numbers of repetitions. For example, the configuration parameter set related to candidate numbers of repetitions can be determined based on a communication specification, or the configuration parameter set related to candidate numbers of repetitions can be sent to a user terminal through the base station, or the configuration parameter set related to candidate numbers of repetitions can be pre-configured in a terminal and the base station, etc.

In an embodiment of the disclosure, the configuration parameter set related to candidate numbers of repetitions may be a configuration table related to candidate numbers of repetitions, or in any other appropriate presentation methods.

In related art, with the continuous development of Internet of Things (IoT) services, such as video surveillance, smart homes, wearable devices, and industrial sensor detection, these IoT services have high requirements for transmission rate and delay. In order to adapt to the high requirements of the IoT services for transmission rate and delay, a base station needs to perform coverage enhancement on user terminals. Currently, a retransmission method is mostly adopted for the coverage enhancement. However, there is currently no effective method for configuring retransmission or the number of repetitions in the related art. Especially in a random access (RA) scenario, a connection between the base station and the user terminal has not been established, and a channel status of the user terminal has not been obtained. According to the configuration method in the related art, it is difficult to effectively configure the parameters related to retransmission and the number of repetitions of the random access channel.

In the disclosure, the base station can obtain the configuration parameter set related to candidate numbers of repetitions predefined in specification or notified by a broadcasting channel (BCH). The configuration parameter set related to candidate numbers of repetitions includes at least one set of candidate numbers of repetitions. The set of candidate numbers of repetitions is used to determine the number of repetitions of the at least one random access channel. That is to say, in the disclosure, for example, the number of repetitions of the random access channel can be predefined in the specification or notified by the broadcasting channel. Therefore, the number of repetitions of the random access channel can be predefined before establishing a connection between the base station and the user terminal, which can effectively solve the problem that there is currently no effective method for configuring retransmission or the number of repetitions in the related art. In an embodiment of the disclosure, the configuration parameter set related to candidate numbers of repetitions can be a configuration parameter set related to candidate numbers of repetitions, or may be presented in any other appropriate form.

Optionally, before obtaining the configuration parameter set related to candidate numbers of repetitions predefined in the specification or notified by the broadcasting channel, the configuration parameter set related to candidate numbers of repetitions can be defined in the specification in advance or notified by the broadcasting channel. The configuration parameter set related to candidate numbers of repetitions includes at least one set of candidate numbers of repetitions.

Optionally, the configuration parameter set related to candidate numbers of repetitions can be set according to an actual situation. For example, it may be set according to a user terminal type, a transmission capacity of the user terminal, a channel type, etc. The transmission capacity of the user terminal includes parameters such as antenna configuration and bandwidth configuration, which are not too limited here.

In an embodiment of the disclosure, there may be many ways for determining the configuration parameter set related to candidate numbers of repetitions. For example, it can be determined based on relevant communication specifications, it can be determined through a configuration file predefined in the base station and the UE, or it can be configured to the UE through the base station. This is not limited in the embodiments of the disclosure.

In an embodiment of the disclosure, there is no restriction on the type of the random access channel, including a channel carrying information during the random access process of the terminal. For example, the random access channel can be a Physical Random Access Channel (PRACH).

In an embodiment of the disclosure, there is no restriction on the type of the broadcasting channel, such as a synchronization signal/master information block (SSB), remaining main system information (RMSI), etc.

According to the method for configuring a candidate number of repetitions according to the embodiments of the present disclosure, the configuration parameter set related to candidate numbers of repetitions is determined, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

FIG. 2 is a flowchart of a method for configuring a candidate number of repetitions according to another embodiment of the disclosure. The method is performed by a base station. As illustrated in FIG. 2, the method for configuring a candidate number of repetitions includes following steps.

S201, a configuration parameter set related to candidate numbers of repetitions is determined, the configuration parameter set related to candidate numbers of repetitions includes at least one set of candidate numbers of repetitions, and the set of candidate numbers of repetitions is used to determine a number of repetitions of at least one random access channel, the configuration parameter set related to candidate numbers of repetitions includes a correspondence relation between the set of candidate numbers of repetitions and at least one of a user terminal type and a channel type.

In an embodiment of the disclosure, the configuration parameter set related to candidate numbers of repetitions includes the correspondence relation between the set of candidate numbers of repetitions and at least one of the user terminal type and the channel type, which may including following three possible implementations.

Method 1, the configuration parameter set related to candidate numbers of repetitions includes a correspondence relation between the set of candidate numbers of repetitions and the user terminal type.

It can be understood that different user terminal types can correspond to different sets of candidate numbers of repetitions.

In some embodiments of the disclosure, the configuration parameter set related to candidate numbers of repetitions includes the correspondence relation between the set of candidate numbers of repetitions and the user terminal type. At this time, configuring a target set of numbers of repetitions of the random access channel can include: obtaining a type of a user terminal requesting access in response to the configuration parameter set related to candidate numbers of repetitions includes the correspondence relation between the user terminal type and the set of candidate numbers of repetitions, obtaining a set of candidate numbers of repetitions corresponding to the type of the user terminal requesting access according to the configuration parameter set related to candidate numbers of repetitions, and configuring the obtained set of candidate numbers of repetitions as a target set of candidate numbers of repetitions corresponding to the random access channel.

For example, the configuration parameter set related to candidate numbers of repetitions can be set by referring to the configuration parameter set a related to candidate numbers of repetitions shown in Table 1.

TABLE 1

| Configuration parameter set a related to candidate numbers of repetitions | |
|---|---|
| user terminal type | set of candidate numbers of repetitions |
| A | set 4 of candidate numbers of repetitions |
| B | set 2 of candidate numbers of repetitions |
| C | set 1 of candidate numbers of repetitions |
| D | set 3 of candidate numbers of repetitions |

It can be understood that each element and each correspondence relation in Table 1 exist independently. These elements and correspondence relations are illustratively listed in the same table, but it does not mean that the elements and the correspondence relations in the table must exist simultaneously as shown in Table 1. A value of each element and each correspondence relation are independent of any other element values or correspondence relations in Table 1. Therefore, those skilled in the art can understand that the value of each element and each correspondence relation in Table 1 are independent embodiments.

As shown in Table 1, the configuration parameter set a related to candidate numbers of repetitions includes four sets of candidate numbers of repetitions, namely sets 1 to 4 of candidate numbers of repetitions. If the type of the user terminal requesting access is A, by querying the configuration parameter set a related to candidate numbers of repetitions, a set of candidate numbers of repetitions corresponding to the user terminal type A can be obtained to be the set 4 of candidate numbers of repetitions. The set 4 of candidate numbers of repetitions can be configured as the target set of candidate numbers of repetitions corresponding to the random access channel.

Therefore, in this method, when the configuration parameter set related to candidate numbers of repetitions includes the correspondence relation between the user terminal type and the set of candidate numbers of repetitions, the type of the user terminal requesting access can be obtained, and the corresponding set of candidate numbers of repetitions is obtained. The obtained set of candidate numbers of repetitions is configured as the target set of candidate numbers of repetitions corresponding to the random access channel, to configure the target set of numbers of repetitions for the random access channel.

Method 2, the configuration parameter set related to candidate numbers of repetitions includes a correspondence relation between the set of candidate numbers of repetitions and the channel type.

It can be understood that different channel types can correspond to different sets of candidate numbers of repetitions.

In some embodiments of the disclosure, the configuration parameter set related to candidate numbers of repetitions includes the correspondence relation between the set of candidate numbers of repetitions and the channel type. At this time, configuring a target set of numbers of repetitions of the random access channel can include: obtaining a set of candidate numbers of repetitions corresponding to the random access channel according to the configuration parameter set related to candidate numbers of repetitions in response to the configuration parameter set related to candidate numbers of repetitions including a correspondence relation between the set of candidate numbers of repetitions and the channel type, and configuring the set of candidate numbers of repetitions obtained as a target set of candidate numbers of repetitions corresponding to the random access channel.

For example, the configuration parameter set related to candidate numbers of repetitions can be set by referring to the configuration parameter set b related to candidate numbers of repetitions shown in Table 2.

TABLE 2

| Configuration parameter set b related to candidate numbers of repetitions | |
|---|---|
| channel type | set of candidate numbers of repetitions |
| M | set 4 of candidate numbers of repetitions |
| N | set 2 of candidate numbers of repetitions |
| S | set 1 of candidate numbers of repetitions |
| T | set 3 of candidate numbers of repetitions |

It can be understood that each element and each correspondence relation in Table 2 exist independently. These elements and correspondence relations are illustratively listed in the same table, but it does not mean that the elements and the correspondence relations in the table must exist simultaneously as shown in Table 2. A value of each element and each correspondence relation are independent of any other element values or correspondence relations in Table 2. Therefore, those skilled in the art can understand that the value of each element and each correspondence relation in Table 2 are independent embodiments.

As shown in Table 2, the configuration parameter set b related to candidate numbers of repetitions includes four sets of candidate numbers of repetitions, namely sets 1 to 4 of candidate numbers of repetitions. If the channel type of the random access channel is N, by querying the configuration parameter set b related to candidate numbers of repetitions, a set of candidate numbers of repetitions corresponding to the channel type N can be obtained to be the set 2 of candidate numbers of repetitions. The set 2 of candidate numbers of repetitions can be configured as the target set of candidate numbers of repetitions corresponding to the random access channel.

Therefore, in this method, when the configuration parameter set related to candidate numbers of repetitions includes the correspondence relation between the channel type and the set of candidate numbers of repetitions, the set of candidate numbers of repetitions corresponding to the channel type of the random access channel can be obtained, and the obtained set of candidate numbers of repetitions is configured as the target set of candidate numbers of repetitions corresponding to the random access channel, to configure the target set of numbers of repetitions for the random access channel.

Method 3, the configuration parameter set related to candidate numbers of repetitions includes a correspondence relation between the user terminal type, the channel type, and the set of candidate numbers of repetitions.

It can be understood that, when the user terminal type is the same, different channel types can correspond to different sets of candidate numbers of repetitions, accordingly, when the user terminal type is the same, different channel types can correspond to different sets of candidate numbers of repetitions.

In some embodiments of the disclosure, the configuration parameter set related to candidate numbers of repetitions includes the correspondence relation between the user terminal type, the channel type, and the set of candidate numbers of repetitions. At this time, configuring a target set of numbers of repetitions of the random access channel can include: obtaining a type of a user terminal requesting access in response to the configuration parameter set related to candidate numbers of repetitions includes the correspondence relation between the user terminal type, the channel type, and the set of candidate numbers of repetitions, obtaining a set of candidate numbers of repetitions corresponding to the type of the user terminal requesting access and the random access channel according to the configuration parameter set related to candidate numbers of repetitions, and configuring the obtained set of candidate numbers of repetitions as a target set of candidate numbers of repetitions corresponding to the random access channel.

For example, the configuration parameter set related to candidate numbers of repetitions can be set by referring to the configuration parameter set c related to candidate numbers of repetitions shown in Table 3.

TABLE 3

| Configuration parameter set c related to candidate numbers of repetitions | | | | |
|---|---|---|---|---|
| set of candidate numbers of repetitions | | channel type | | |
| | | second random access channel | third random access channel | fourth random access channel |
| user terminal type | user terminal type A | set 1 of candidate numbers of repetitions | set 1 of candidate numbers of repetitions | set 2 of candidate numbers of repetitions |
| | user terminal type B | set 2 of candidate numbers of repetitions | set 3 of candidate numbers of repetitions | set 4 of candidate numbers of repetitions |

It can be understood that each element and each correspondence relation in Table 3 exist independently. These elements and correspondence relations are illustratively listed in the same table, but it does not mean that the elements and the correspondence relations in the table must exist simultaneously as shown in Table 3. A value of each element and each correspondence relation are independent of any other element values or correspondence relations in Table 3. Therefore, those skilled in the art can understand that the value of each element and each correspondence relation in Table 3 are independent embodiments.

As shown in Table 3, the channel type includes the second random access channel, the third random access channel, and the fourth random access channel. The second random access channel, the third random access channel, and the fourth random access channel are used to transmit a second random access instruction (msg.2), a third random access instruction (msg.3), and a fourth random access instruction (msg.4), respectively.

As shown in Table 3, the configuration parameter set c related to candidate numbers of repetitions includes four sets of candidate numbers of repetitions, namely sets 1 to 4 of candidate numbers of repetitions. If the type of the terminal requesting access is A and the channel type of the random access channel is the third random access channel, by querying the configuration parameter set c related to candidate numbers of repetitions, a set of candidate numbers of repetitions corresponding to the user terminal type A and the third random access channel can be obtained to be the set 1 of candidate numbers of repetitions. The set 1 of candidate numbers of repetitions can be configured as the target set of candidate numbers of repetitions corresponding to the random access channel.

Therefore, in this method, when the configuration parameter set related to candidate numbers of repetitions includes the correspondence relation between the user terminal type, the channel type, and the set of candidate numbers of repetitions, the type of the user terminal requesting access and the channel type of the random access channel can be obtained, the set of candidate numbers of repetitions corresponding to the type of the user terminal and the channel type of the random access channel can be obtained, and the obtained set of candidate numbers of repetitions is configured as the target set of candidate numbers of repetitions corresponding to the random access channel, to configure the target set of numbers of repetitions for the random access channel.

According to the method for configuring a candidate number of repetitions according to the embodiments of the present disclosure, the configuration parameter set related to candidate numbers of repetitions is determined, the configuration parameter set related to candidate numbers of repetitions includes at least one set of candidate numbers of repetitions, the set of candidate numbers of repetitions is used to determine a number of repetitions of at least one random access channel, and the configuration parameter set related to candidate numbers of repetitions includes the correspondence relation between the set of candidate numbers of repetitions and at least one of the user terminal type and the channel type. In this way, the set of candidate numbers of repetitions corresponding to the random access channel can be obtained based on the correspondence relation between the set of candidate numbers of repetitions and at least one of the user terminal type and the channel type, to configure the target set of numbers of repetitions of the random access channel, which can effectively configure the number of repetitions of the random access channel, thus enhancing the coverage of the random access channel and meeting the high requirements of the Internet of Things business for transmission rate and delay.

On the basis of any of the above embodiments, during the process of configuring the target set of numbers of repetitions for the random access channel, switch may be performed on the target set of numbers of repetitions of the random access channel.

For example, when the channel type includes a first random access channel, a second random access channel, a third random access channel, and a fourth random access channel, it is not necessary to configure the number of repetitions of the first random access channel, but the number of repetitions of the second random access channel, the number of repetitions of the third random access channel, and the number of repetitions of the fourth random access channel may be configured. In the disclosure, target sets of numbers of repetitions of the second random access channel, the third random access channel and the fourth random access channel may be configured.

If the base station determines to perform a set switch, a target set of candidate numbers of repetitions corresponding to the third random access channel and/or the fourth random access channel may be switched to another set of candidate numbers of repetitions in the configuration parameter set related to candidate numbers of repetitions.

For example, if the base station determines to perform set switch a set switch, the configuration parameter set related to candidate numbers of repetitions includes sets 1 to 4 of candidate numbers of repetitions, a target set of candidate numbers of repetitions corresponding to the third random access channel is set 1 of candidate numbers of repetitions, and a target set of candidate numbers of repetitions corresponding to the fourth random access channel is set 3 of candidate numbers of repetitions, the target set of candidate numbers of repetitions corresponding to the third random access channel can be switched from the set 1 of candidate numbers of repetitions to a set 2 of candidate numbers of repetitions, and the target set of candidate numbers of repetitions corresponding to the fourth random access channel can be switched from the set 3 of candidate numbers of repetitions to a set 4 of candidate numbers of repetitions.

Optionally, determining to perform the set switch can include determining to perform the set switch according to a reception power of a random access preamble in a received first random access signaling (msg.1). The first random access signaling is a signaling sent by the user terminal to the base station through the first random access channel. The first random access signaling includes the random access preamble. Furthermore, the base station can receive the first random access signaling and determine, based on the reception power of the random access preamble in the first random access signaling, that the set switch may be performed.

Optionally, determining to perform the set switch can also include sending a second random access signaling through the second random access channel. The second random access channel includes a switching indication, and the switching indication is used to indicate to perform the set switch. In this way, the base station can indicate, through the second random access signaling, the user terminal to perform the set switch.

FIG. 3 is a flowchart of a method for configuring a candidate number of repetitions according to another embodiment of the disclosure. The method is performed by a base station. As illustrated in FIG. 3, the method for configuring a candidate number of repetitions includes following steps.

S301, an access resource on which a user terminal requesting access sends a first random access signaling is obtained.

In an embodiment of the disclosure, the base station may obtain the access resource on which the user terminal requesting access sends the first random access signaling.

Optionally, the access resource for the first random access signaling can be divided based on a time domain, a frequency domain, and a random access preamble. That is to say, the access resource can be obtained based on the time domain, the frequency domain, and the random access preamble.

S302, a set of candidate numbers of repetitions corresponding to the access resource is obtained according to a predefined mapping relation table between access resources and sets of candidate numbers of repetitions.

Optionally, the predefined mapping relation table between the access resources and the sets of candidate numbers of repetitions can be set according to an actual situation and is pre-set in a storage space of the base station.

For example, the predefined mapping relation table between the access resources and the sets of candidate numbers of repetitions can be set according to a mapping relation table d shown in Table 4.

TABLE 4

| Mapping relation table d | |
|---|---|
| access resource | set of candidate numbers of repetitions |
| 1~P | set 1 of candidate numbers of repetitions |
| P + 1~Q | set 2 of candidate numbers of repetitions |

It can be understood that each element and each correspondence relation in Table 4 exist independently. These elements and correspondence relations are illustratively listed in the same table, but it does not mean that the elements and the correspondence relations in the table must exist simultaneously as shown in Table 4. A value of each element and each correspondence relation are independent of any other element values or correspondence relations in Table 4. Therefore, those skilled in the art can understand that the value of each element and each correspondence relation in Table 4 are independent embodiments.

As shown in Table 4, the predefined access resources include access resources 1 to Q, where P and Q are both positive integers. A set of candidate numbers of repetitions corresponding to access resources 1 to P is set 1 of candidate numbers of repetitions, and a set of candidate numbers of repetitions corresponding to access resources P+1 to Q is set 2 of candidate numbers of repetitions.

S303, the obtained set of candidate numbers of repetitions is configured as a target set of candidate numbers of repetitions corresponding to at least one random access channel.

For example, if the obtained set of candidate numbers of repetitions is the set 1 of candidate numbers of repetitions, and the random access channel includes a second random access channel, a third random access channel, and a fourth random access channel, the set 1 of candidate numbers of repetitions can be configured as the target set of candidate numbers of repetitions corresponding to the second random access channel, the third random access channel, and the fourth random access channel.

According to the method for configuring a candidate number of repetitions according to the embodiments of the present disclosure, the access resource on which the user terminal requesting access sends the first random access signaling is obtained, the set of candidate numbers of repetitions corresponding to the access resource is obtained according to the predefined mapping relation table between access resources and sets of candidate numbers of repetitions, and the obtained set of candidate numbers of repetitions is configured as the target set of candidate numbers of repetitions corresponding to at least one random access channel. In this way, the set of candidate numbers of repetitions corresponding to the access resource can be obtained based on the mapping relation table between access resources and sets of candidate numbers of repetitions, to configure the target set of numbers of repetitions of the random access channel. The number of repetitions of the random access channel can be predefined before establishing a connection between the base station and the user terminal, which can effectively configure the number of repetitions of the random access channel, thus enhancing the coverage of the random access channel and meeting the high requirements of the Internet of Things business for transmission rate and delay.

On the basis of any of the above embodiments, during the process of configuring the target set of numbers of repetitions for the random access channel, switch may be performed on the target set of numbers of repetitions of the random access channel.

If the base station determines to perform a set switch, a target set of candidate numbers of repetitions corresponding to the third random access channel and/or the fourth random access channel may be switched to another set of candidate numbers of repetitions in the mapping relation table.

For example, if the base station determines to perform a set switch, the mapping relation table includes sets 1 to 4 of candidate numbers of repetitions, a target set of candidate numbers of repetitions corresponding to the third random access channel is set 1 of candidate numbers of repetitions, and a target set of candidate numbers of repetitions corresponding to the fourth random access channel is set 3 of candidate numbers of repetitions, the target set of candidate numbers of repetitions corresponding to the third random access channel can be switched from the set 1 of candidate numbers of repetitions to a set 2 of candidate numbers of repetitions, and the target set of candidate numbers of repetitions corresponding to the fourth random access channel can be switched from the set 3 of candidate numbers of repetitions to a set 4 of candidate numbers of repetitions.

Optionally, determining to perform the set switch can include determining to perform the set switch according to a reception power of a random access preamble in a received first random access signaling (msg.1). The first random access signaling is a signaling sent by the user terminal to the base station through the first random access channel. The first random access signaling includes the random access preamble. Furthermore, the base station can receive the first random access signaling and determine, based on the reception power of the random access preamble in the first random access signaling, that the set switch may be performed.

Optionally, determining to perform the set switch can also include sending a second random access signaling through the second random access channel. The second random access channel includes a switching indication, and the switching indication is used to indicate to perform the set switch. In this way, the base station can indicate, through the second random access signaling, the user terminal to perform the set switch.

FIG. 4 is a flowchart of a method for configuring a candidate number of repetitions according to another embodiment of the disclosure. The method is performed by a user terminal. As illustrated in FIG. 4, the method for configuring a candidate number of repetitions includes following steps.

S401, a configuration parameter set related to candidate numbers of repetitions is determined, the configuration parameter set related to candidate numbers of repetitions includes at least one set of candidate numbers of repetitions, and the set of candidate numbers of repetitions is used to determine a number of repetitions of at least one random access channel.

In the disclosure, the user terminal can obtain the configuration parameter set related to candidate numbers of repetitions predefined in a specification or notified by a broadcasting channel (BCH). The configuration parameter set related to candidate numbers of repetitions includes at least one set of candidate numbers of repetitions. The set of candidate numbers of repetitions is used to determine the number of repetitions at least one random access channel. That is to say, in the disclosure, for example, the number of repetitions of the random access channel can be defined in the specification in advance or notified by the broadcasting channel. Therefore, the number of repetitions of the random access channel can be predefined before establishing a connection between a base station and the user terminal, which can effectively solve the problem that there is currently no effective method for configuring repetitions or the number of repetitions in the related art.

Optionally, before obtaining the configuration parameter set related to candidate numbers of repetitions predefined in the specification or notified by the broadcasting channel, the configuration parameter set related to candidate numbers of repetitions can be defined in the specification in advance or notified by the broadcasting channel. The configuration parameter set related to candidate numbers of repetitions includes at least one set of candidate numbers of repetitions.

Optionally, the set of candidate numbers of repetitions can be set according to an actual situation. For example, it may be set according to a user terminal type, a transmission capacity of the user terminal, a channel type, etc. The transmission capacity of the user terminal includes parameters such as antenna configuration and bandwidth configuration, which are not too limited here.

In an embodiment of the disclosure, there is no restriction on the type of the random access channel. For example, the random access channel can be a Physical Random Access Channel (PRACH).

In an embodiment of the disclosure, there is no restriction on a type of a broadcast channel. For example, the broadcast channel includes, but is not limited to a broadcast control channel (BCCH), a frequency correction channel (FCCH), a synchronization channel (SCH), etc.

According to the method for configuring a candidate number of repetitions according to the embodiments of the present disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

FIG. 5 is a flowchart of a method for configuring a candidate number of repetitions according to another embodiment of the disclosure. The method is performed by a user terminal. As illustrated in FIG. 5, the method for configuring a candidate number of repetitions includes following steps.

S501, a configuration parameter set related to candidate numbers of repetitions predefined in a specification or notified by a broadcasting channel is obtained, the configuration parameter set related to candidate numbers of repetitions includes at least one set of candidate numbers of repetitions, the set of candidate numbers of repetitions is used to determine a number of repetitions of at least one random access channel, and the configuration parameter set related to candidate numbers of repetitions includes a correspondence relation between the set of candidate numbers of repetitions and at least one of a user terminal type and a channel type.

In an embodiment of the disclosure, the configuration parameter set related to candidate numbers of repetitions includes the correspondence relation between the set of candidate numbers of repetitions and at least one of the user terminal type and the channel type, which may including following three possible implementations.

Method 1, the configuration parameter set related to candidate numbers of repetitions includes a correspondence relation between the set of candidate numbers of repetitions and the user terminal type.

It can be understood that different user terminal types can correspond to different sets of candidate numbers of repetitions.

In some embodiments of the disclosure, the configuration parameter set related to candidate numbers of repetitions includes the correspondence relation between the set of candidate numbers of repetitions and the user terminal type. At this time, configuring a target set of numbers of repetitions of the random access channel can include: obtaining a set of candidate numbers of repetitions corresponding to a type of the user terminal according to the configuration parameter set related to candidate numbers of repetitions in response to the configuration parameter set related to candidate numbers of repetitions including a correspondence relation between the set of candidate numbers of repetitions and the user terminal type, and configuring the set of candidate numbers of repetitions obtained as a target set of candidate numbers of repetitions corresponding to the random access channel.

Therefore, in this method, when the configuration parameter set related to candidate numbers of repetitions includes the correspondence relation between the user terminal type and the set of candidate numbers of repetitions, the set of candidate numbers of repetitions corresponding to the type of the user terminal is obtained, the obtained set of candidate numbers of repetitions is configured as the target set of candidate numbers of repetitions corresponding to the random access channel, to configure the target set of numbers of repetitions for the random access channel.

Method 2, the configuration parameter set related to candidate numbers of repetitions includes a correspondence relation between the set of candidate numbers of repetitions and the channel type.

It can be understood that different channel types can correspond to different sets of candidate numbers of repetitions.

In some embodiments of the disclosure, the configuration parameter set related to candidate numbers of repetitions includes the correspondence relation between the set of candidate numbers of repetitions and the channel type. At this time, configuring a target set of numbers of repetitions of the random access channel can include: obtaining a set of candidate numbers of repetitions corresponding to the random access channel according to the configuration parameter set related to candidate numbers of repetitions in response to the configuration parameter set related to candidate numbers of repetitions including a correspondence relation between the set of candidate numbers of repetitions and the channel type, and configuring the set of candidate numbers of repetitions obtained as a target set of candidate numbers of repetitions corresponding to the random access channel.

Therefore, in this method, when the configuration parameter set related to candidate numbers of repetitions includes the correspondence relation between the channel type and the set of candidate numbers of repetitions, the set of candidate numbers of repetitions corresponding to the channel type of the random access channel can be obtained, and the obtained set of candidate numbers of repetitions is configured as the target set of candidate numbers of repetitions corresponding to the random access channel, to configure the target set of numbers of repetitions for the random access channel.

Method 3, the configuration parameter set related to candidate numbers of repetitions includes a correspondence relation between the user terminal type, the channel type, and the set of candidate numbers of repetitions.

It can be understood that, when the user terminal type is the same, different channel types can correspond to different sets of candidate numbers of repetitions, accordingly, when the user terminal type is the same, different channel types can correspond to different sets of candidate numbers of repetitions.

In some embodiments of the disclosure, the configuration parameter set related to candidate numbers of repetitions includes the correspondence relation between the user terminal type, the channel type, and the set of candidate numbers of repetitions. At this time, configuring a target set of numbers of repetitions of the random access channel can include: obtaining a set of candidate numbers of repetitions corresponding to the type of the user terminal and the random access channel according to the configuration parameter set related to candidate numbers of repetitions in response to the configuration parameter set related to candidate numbers of repetitions includes the correspondence relation between the user terminal type, the channel type, and the set of candidate numbers of repetitions, and configuring the obtained set of candidate numbers of repetitions as a target set of candidate numbers of repetitions corresponding to the random access channel.

According to the method for configuring a candidate number of repetitions according to the embodiments of the present disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, the set of candidate numbers of repetitions is used to determine the number of repetitions of at least one random access channel, and the configuration parameter set related to candidate numbers of repetitions includes the correspondence relation between the set of candidate numbers of repetitions and at least one of the user terminal type and the channel type. In this way, the set of candidate numbers of repetitions corresponding to the random access channel can be obtained based on the correspondence relation between the set of candidate numbers of repetitions and at least one of the user terminal type and the channel type, to configure the target set of numbers of repetitions of the random access channel, which can effectively configure the number of repetitions of the random access channel, thus enhancing the coverage of the random access channel and meeting the high requirements of the Internet of Things business for transmission rate and delay.

On the basis of any of the above embodiments, during the process of configuring the target set of numbers of repetitions for the random access channel, switch may be performed on the target set of numbers of repetitions of the random access channel.

For example, when the channel type includes a first random access channel, a second random access channel, a third random access channel, and a fourth random access channel, it is not necessary to configure the number of repetitions of the first random access channel, but the number of repetitions of the second random access channel, the number of repetitions of the third random access channel, and the number of repetitions of the fourth random access channel may be configured. In the disclosure, target sets of numbers of repetitions of the second random access channel, the third random access channel and the fourth random access channel may be configured.

Optionally, the user terminal can switch a target set of candidate numbers of repetitions corresponding to a third random access channel and/or a fourth random access channel to another set of candidate numbers of repetitions in the configuration parameter set related to candidate numbers of repetitions according to a switch indication in a received second random access signaling.

For example, the configuration parameter set related to candidate numbers of repetitions includes sets 1 to 4 of candidate numbers of repetitions, a target set of candidate numbers of repetitions corresponding to the third random access channel is set 1 of candidate numbers of repetitions, and a target set of candidate numbers of repetitions corresponding to the fourth random access channel is set 3 of candidate numbers of repetitions. The user terminal can switch, according to the switch indication in the received second random access signaling, the target set of candidate numbers of repetitions corresponding to the third random access channel from the set 1 of candidate numbers of repetitions to a set 2 of candidate numbers of repetitions, and can switch the target set of candidate numbers of repetitions corresponding to the fourth random access channel from the set 3 of candidate numbers of repetitions to a set 4 of candidate numbers of repetitions.

FIG. 6 is a flowchart of a method for configuring a candidate number of repetitions according to another embodiment of the disclosure. The method is performed by a user terminal. As illustrated in FIG. 6, the method for configuring a candidate number of repetitions includes following steps.

S601, a measurement value of a reference signal receiving power of the user terminal is obtained.

In an embodiment of the disclosure, the user terminal can obtain a measurement value of its own reference signal receiving power (RSRP). Optionally, the measurement value of the reference signal receiving power of the user terminal may include a measurement value of a reference signal receiving power of at least one random access channel.

S602, a measurement range corresponding to the measurement value is determined.

Optionally, multiple measurement ranges can be pre-divided for measurement values of the reference signal receiving power, so that after obtaining the above measurement value, a measurement range corresponding to the measurement range can be determined based on the measurement value and the pre-divided measurement ranges.

S603, a set of candidate numbers of repetitions corresponding to the measurement range is obtained according to a predefined mapping relation table between measurement ranges and sets of candidate numbers of repetitions.

Optionally, the predefined mapping relation table between the measurement ranges and the sets of candidate numbers of repetitions can be set according to an actual situation and predefined in a storage space of the user terminal.

For example, the predefined mapping relation table between the measurement ranges and the sets of candidate numbers of repetitions can be set according to the mapping relation table e shown in Table 5.

TABLE 5

| Mapping relation table e | |
|---|---|
| measurement range | set of candidate numbers of repetitions |
| X~Y | set 1 of candidate numbers of repetitions |
| R~Z | set 2 of candidate numbers of repetitions |

It can be understood that each element and each correspondence relation in Table 5 exist independently. These elements and correspondence relations are illustratively listed in the same table, but it does not mean that the elements and the correspondence relations in the table must exist simultaneously as shown in Table 5. A value of each element and each correspondence relation are independent of any other element values or correspondence relations in Table 5. Therefore, those skilled in the art can understand that the value of each element and each correspondence relation in Table 5 are independent embodiments.

As shown in Table 5, the predefined measurement ranges includes two measurement ranges: X~Y, and R~Z. X, Y, R, and Z can be set according to an actual situation. A set of candidate numbers of repetitions corresponding to the measurement range X~Y is a set 1 of candidate numbers of repetitions, and a set of candidate numbers of repetitions corresponding to the measurement range R~Z is a set 2 of candidate numbers of repetitions.

S604, the obtained set of candidate numbers of repetitions is configured as a target set of candidate numbers of repetitions corresponding to a random access channel.

For example, if the set of candidate numbers of repetitions obtained is the set 1 of candidate numbers of repetitions, and the random access channel includes a second random access channel, a third random access channel, and a fourth random access channel, the set 1 of candidate numbers of repetitions can be configured as the target set of candidate numbers of repetitions corresponding to the second random access channel, the third random access channel, and the fourth random access channel.

According to the method for configuring a candidate number of repetitions according to the embodiments of the present disclosure, measurement value of the reference signal receiving power of the user terminal is obtained, the measurement range corresponding to the measurement value is determined, and the set of candidate numbers of repetitions corresponding to the measurement range is obtained based on the predefined mapping relation table between the measurement ranges and the sets of candidate numbers of repetitions, the set of candidate numbers of repetitions obtained is configured as the target set of candidate numbers of repetitions corresponding to the random access channel. In this way, the set of candidate numbers of repetitions corresponding to the measurement range is obtained based on the predefined mapping relation table between the measurement ranges and the sets of candidate numbers of repetitions, to configure the target set of numbers of repetitions for the random access channel. The number of repetitions of the random access channel can be predefined before establishing a connection between the user terminal and a base station, which can effectively configure the number of repetitions of the random access channel, thus, enhancing the coverage of random access channel and meeting the high requirements of the Internet of Things business for transmission rate and delay.

On the basis of any of the above embodiments, during the process of configuring the target set of numbers of repetitions for the random access channel, switch may be performed on the target set of numbers of repetitions of the random access channel.

For example, when the channel type includes a first random access channel, a second random access channel, a third random access channel, and a fourth random access channel, it is not necessary to configure the number of repetitions of the first random access channel, but the number of repetitions of the second random access channel, the number of repetitions of the third random access channel, and the number of repetitions of the fourth random access channel may be configured. In the disclosure, target sets of numbers of repetitions of the second random access channel, the third random access channel and the fourth random access channel may be configured.

Optionally, the user terminal can switch a target set of candidate numbers of repetitions corresponding to a third random access channel and/or a fourth random access channel to another set of candidate numbers of repetitions in the mapping relation table according to a switch indication in a received second random access signaling.

For example, the mapping relation table includes sets 1 to 4 of candidate numbers of repetitions, a target set of candidate numbers of repetitions corresponding to the third random access channel is set 1 of candidate numbers of repetitions, and a target set of candidate numbers of repetitions corresponding to the fourth random access channel is set 3 of candidate numbers of repetitions. The user terminal can switch, according to the switch indication in the received second random access signaling, the target set of candidate numbers of repetitions corresponding to the third random access channel from the set 1 of candidate numbers of repetitions to a set 2 of candidate numbers of repetitions, and can switch the target set of candidate numbers of repetitions corresponding to the fourth random access channel from the set 3 of candidate numbers of repetitions to a set 4 of candidate numbers of repetitions.

Corresponding to the method for configuring a candidate number of repetitions provided in the above embodiments, this disclosure also provides an apparatus for configuring a candidate number of repetitions, applied by a base station. As the apparatus for configuring a candidate number of repetitions provided in the disclosure corresponds to the method for configuring a candidate number of repetitions provided in the above embodiments of FIG. 1-FIG. 2, the implementations of the method for configuring a candidate number of repetitions is also applicable to the apparatus for configuring a candidate number of repetitions provided in this disclosure, and will not be described in detail in this embodiment. FIG. 7 is a block diagram of an apparatus for configuring a candidate number of repetitions according to an embodiment of the disclosure. FIG. 7 is a block diagram of an apparatus for configuring a candidate number of repetitions according to an embodiment of the disclosure.

FIG. 7 is a block diagram of an apparatus for configuring a candidate number of repetitions according to an embodiment of the disclosure.

As shown in FIG. 7, the apparatus 100 for configuring a candidate number of repetitions includes a first obtaining module 110.

The first obtaining module 110 is configured to obtain a configuration parameter set related to candidate numbers of repetitions predefined in a specification or notified by a broadcasting channel, the configuration parameter set related to candidate numbers of repetitions includes at least one set of candidate numbers of repetitions, and the set of candidate numbers of repetitions is used to determine a number of repetitions of at least one random access channel.

With the apparatus for configuring a candidate number of repetitions of the embodiments of the disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

Figure 8:
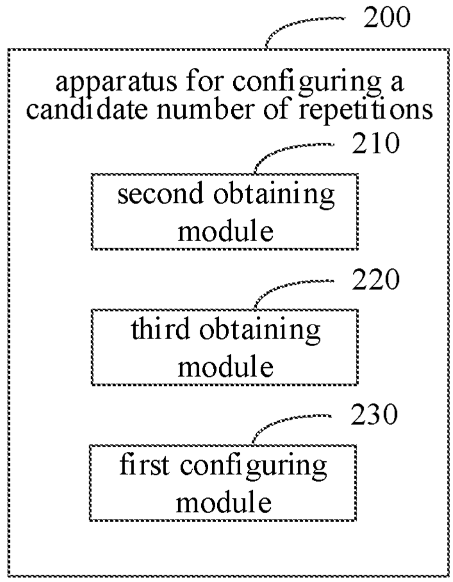
FIG. 8 is a block diagram of an apparatus for configuring a candidate number of repetitions according to another embodiment of the disclosure.

Corresponding to the method for configuring a candidate number of repetitions provided in the above embodiments, this disclosure also provides an apparatus for configuring a candidate number of repetitions, applied by a base station. As the apparatus for configuring a candidate number of repetitions provided in the disclosure corresponds to the method for configuring a candidate number of repetitions provided in the above embodiments of FIG. 3, the implementations of the method for configuring a candidate number of repetitions is also applicable to the apparatus for configuring a candidate number of repetitions provided in this disclosure, and will not be described in detail in this embodiment. FIG. 8 is a block diagram of an apparatus for configuring a candidate number of repetitions according to an embodiment of the disclosure.

FIG. 8 is a block diagram of an apparatus for configuring a candidate number of repetitions according to another embodiment of the disclosure.

As shown in FIG. 8, the apparatus 200 for configuring a candidate number of repetitions includes a second obtaining module 210, a third obtaining module 220, and a first configuring module 230.

The second obtaining module 210 is configured to obtain an access resource on which a user terminal requesting access sends a first random access signaling.

The third obtaining module 220 is configured to obtain a set of candidate numbers of repetitions corresponding to the access resource according to a predefined mapping relation table between access resources and sets of candidate numbers of repetitions.

The first configuring module 230 is configured to configure the obtained set of candidate numbers of repetitions as a target set of candidate numbers of repetitions corresponding to at least one random access channel.

With the apparatus for configuring a candidate number of repetitions of the embodiments of the disclosure, the access resource on which the user terminal requesting access sends the first random access signaling is obtained, the set of candidate numbers of repetitions corresponding to the access resource is obtained according to the predefined mapping relation table between access resources and sets of candidate numbers of repetitions, and the obtained set of candidate numbers of repetitions is configured as the target set of candidate numbers of repetitions corresponding to at least one random access channel. In this way, the set of candidate numbers of repetitions corresponding to the access resource can be obtained based on the mapping relation table between access resources and sets of candidate numbers of repetitions, to configure the target set of numbers of repetitions of the random access channel. The number of repetitions of the random access channel can be predefined before establishing a connection between the base station and the user terminal, which can effectively configure the number of repetitions of the random access channel, thus enhancing the coverage of the random access channel and meeting the high requirements of the Internet of Things business for transmission rate and delay.

Figure 9:
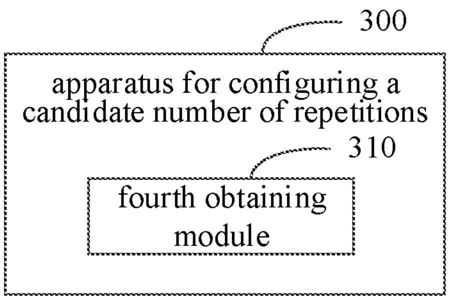
FIG. 9 is a block diagram of an apparatus for configuring a candidate number of repetitions according to another embodiment of the disclosure.

Corresponding to the method for configuring a candidate number of repetitions provided in the above embodiments, this disclosure also provides an apparatus for configuring a candidate number of repetitions, applied by a user terminal. As the apparatus for configuring a candidate number of repetitions provided in the disclosure corresponds to the method for configuring a candidate number of repetitions provided in the above embodiments of FIG. 4-FIG. 5, the implementations of the method for configuring a candidate number of repetitions is also applicable to the apparatus for configuring a candidate number of repetitions provided in this disclosure, and will not be described in detail in this embodiment. FIG. 9 is a block diagram of an apparatus for configuring a candidate number of repetitions according to an embodiment of the disclosure.

FIG. 9 is a block diagram of an apparatus for configuring a candidate number of repetitions according to an embodiment of the disclosure.

As shown in FIG. 9, the apparatus 300 for configuring a candidate number of repetitions includes a fourth obtaining module 310.

The fourth obtaining module 310 is configured to obtain a configuration parameter set related to candidate numbers of repetitions predefined in a specification or notified by a broadcasting channel, the configuration parameter set related to candidate numbers of repetitions comprises at least one set of candidate numbers of repetitions, and the set of candidate numbers of repetitions is used to determine a number of repetitions of at least one random access channel.

With the apparatus for configuring a candidate number of repetitions of the embodiments of the disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

Figures 10, 11:
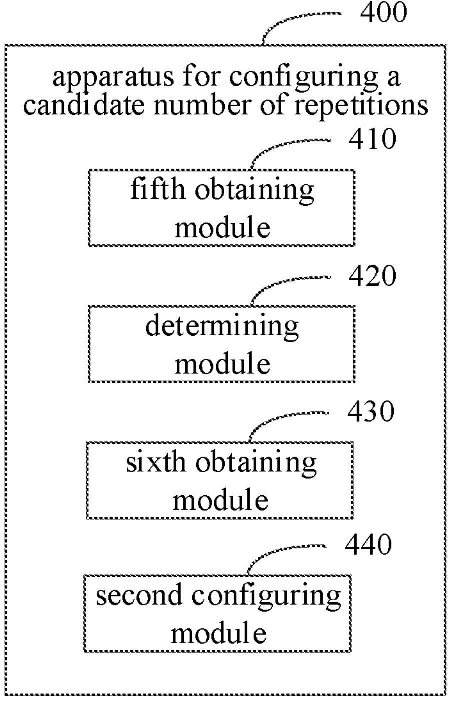
FIG. 10 is a block diagram of an apparatus for configuring a candidate number of repetitions according to another embodiment of the disclosure.
FIG. 11 is a block diagram of an electronic device according to an embodiment of the disclosure.

Corresponding to the method for configuring a candidate number of repetitions provided in the above embodiments, this disclosure also provides an apparatus for configuring a candidate number of repetitions, applied by a user terminal. As the apparatus for configuring a candidate number of repetitions provided in the disclosure corresponds to the method for configuring a candidate number of repetitions provided in the above embodiments of FIG. 6, the implementations of the method for configuring a candidate number of repetitions is also applicable to the apparatus for configuring a candidate number of repetitions provided in this disclosure, and will not be described in detail in this embodiment. FIG. 10 is a block diagram of an apparatus for configuring a candidate number of repetitions according to an embodiment of the disclosure.

FIG. 10 is a block diagram of an apparatus for configuring a candidate number of repetitions according to an embodiment of the disclosure.

As shown in FIG. 10, the apparatus 400 for configuring a candidate number of repetitions includes a fifth obtaining module 410, a determining module 420, a sixth obtaining module 430, and a second configuring module 440.

The fifth obtaining module 410 is configured to obtain a measurement value of a reference signal receiving power of the user terminal.

The determining module 420 is configured to determine a measurement range corresponding to the measurement value.

The sixth obtaining module 430 is configured to obtain a set of candidate numbers of repetitions corresponding to the measurement range according to a predefined mapping relation table between measurement ranges and sets of candidate numbers of repetitions.

The second configuring module 440 is configured to configure the set of candidate numbers of repetitions obtained as a target set of candidate numbers of repetitions corresponding to a random access channel.

With the apparatus for configuring a candidate number of repetitions of the embodiments of the disclosure, the measurement value of the reference signal receiving power of the user terminal is obtained, the measurement range corresponding to the measurement value is determined, and the set of candidate numbers of repetitions corresponding to the measurement range is obtained based on the predefined mapping relation table between the measurement ranges and the sets of candidate numbers of repetitions, the set of candidate numbers of repetitions obtained is configured as the target set of candidate numbers of repetitions corresponding to the random access channel. In this way, the set of candidate numbers of repetitions corresponding to the measurement range is obtained based on the predefined mapping relation table between the measurement ranges and the sets of candidate numbers of repetitions, to configure the target set of numbers of repetitions for the random access channel. The number of repetitions of the random access channel can be predefined before establishing a connection between the user terminal and a base station, which can effectively configure the number of repetitions of the random access channel, thus, enhancing the coverage of random access channel and meeting the high requirements of the Internet of Things business for transmission rate and delay.

In accordance with the embodiments of the disclosure, the disclosure further provides a base station. The user terminal includes the apparatus 100 for configuring a candidate number of repetitions, or the apparatus 200 for configuring a candidate number of repetitions.

With the base station of the embodiments of the disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

In accordance with the embodiments of the disclosure, the disclosure further provides a user terminal. The user terminal includes the apparatus 300 for configuring a candidate number of repetitions, or the apparatus 400 for configuring a candidate number of repetitions.

With the user terminal of the embodiments of the disclosure, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

In accordance with the embodiments of the disclosure, the disclosure further provides an electronic device and a readable storage medium.

As shown in FIG. 11, it is a block diagram of an electronic device according to an embodiment of the disclosure. The electronic device is intended to represent various forms of digital computers, such as a laptop computer, a desktop computer, a workstation, a personal digital assistant, servers, a blade server, a mainframe computer, and other suitable computers. The electronic device may also represent various forms of mobile devices, such as a personal digital processor, a cellular phone, a smart phone, a wearable device, and other similar computing devices. The components, their connections and relationships, and their functions shown herein are by way of example only, and are not intended to limit implementations of the disclosure described and/or claimed herein.

As shown in FIG. 11, the electronic device includes: one or more processors 1100, a memory 1120, and interfaces for connecting various components, including a high-speed interface and a low-speed interface. The various components are interconnected using different buses and may be mounted on a common motherboard or otherwise as desired. The processor may process instructions executed within the communication device, including instructions stored in memory or instructions stored in the memory to display graphical information of the GUI on an external input/output device (such as a display device coupled to the interface). In other embodiments, multiple processors and/or multiple buses may be used with multiple memories, if desired. Likewise, multiple electronic devices may be connected, with each device providing some of the necessary operations (e.g., as a server array, a group of blade servers, or a multi-processor system). In FIG. 11, one processor 1100 is used as an example.

The memory 1200 is the non-transitory computer-readable storage medium provided by the present disclosure. The memory stores instructions executable by at least one processor, so that the at least one processor executes the method for configuring a candidate number of repetitions provided by the present disclosure. The non-transitory computer-readable storage medium of the present disclosure stores computer instructions for causing a computer to perform the method for configuring a candidate number of repetitions provided by the present disclosure.

As a non-transitory computer-readable storage medium, the memory 1200 can be used to store non-transitory software programs, non-transitory computer-executable programs, and modules, such as program instructions/modules (for example, the first obtaining module 110 shown in FIG. 7) corresponding to the method for configuring a candidate number of repetitions in the embodiments of the present disclosure. The processor 1100 executes various functional applications and data processing of the server by running the non-transitory software programs, instructions and modules stored in the memory 1200, i.e., implementing the method for configuring a candidate number of repetitions in the above method embodiments.

The memory 1200 may include a program storage area and a data storage area, the program storage area may store an operating system, an application program required for at least one function; the data storage area may store data created according to the use of the positioning electronic device, and the like. Additionally, the memory 1200 may include a high-speed random access memory, and may also include a non-transitory memory, such as at least one magnetic disk storage device, a flash memory device, or other non-transitory solid-state storage devices. Optionally, the memory 1200 may optionally include a memory located remotely from processor 1100, and these remote memories may be connected to the positioning electronic device via a network. Examples of such networks include, but are not limited to, the internet, an intranet, a local area network, a mobile communication network, and combinations thereof.

The electronic device may further include: an input device 1300 and an output device 1400. The processor 1100, the memory 1200, the input device 1300, and the output device 1400 may be connected through a bus or in other ways, and the connection through a bus is taken as an example in FIG. 11.

The input device 1300 may receive input numerical or character information and generate a key signal input related to user settings and functional control of the positioning electronic device, such as a touch screen, a keypad, a mouse, a trackpad, a touchpad, a pointing stick, one or more mouse buttons, trackballs, joysticks, or other input devices. The output device 2040 may include a display device, an auxiliary lighting device (e.g., LED), and a haptic feedback device (e.g., vibration motor), and the like. The display device may include, but is not limited to, a liquid crystal display (LCD), a light emitting diode (LED) display, and a plasma display. In some implementations, the display device may be a touch screen.

Various implementations of the system and technique described herein can be implemented in a digital electronic circuitry, an integrated circuit system, an application specific ASIC (application specific integrated circuit), computer hardware, firmware, software, and/or a combination thereof. These various embodiments may include being implemented in one or more computer programs executable and/or interpretable on a programmable system including at least one programmable processor, which may be a special purpose or general-purpose programmable processor, may receive data and instructions from a storage system, at least one input device, and at least one output device, and transmit data and instructions to the storage system, the at least one input device, and the at least one output device.

These computational programs (also referred to as programs, software, software applications, or codes) include machine instructions for programmable processors, and may be implemented using high-level procedural and/or object-oriented programming languages, and/or assembly/machine languages. As used herein, the terms "machine-readable medium" and "computer-readable medium" refer to any computer program product, device, and/or apparatus (for example, a magnetic disk, an optical disk, a memory, a programmable logic device (PLD)) for providing machine instructions and/or data to a programmable processor, including machine-readable media that receive machine instructions as machine-readable signals. The term "machine-readable signal" refers to any signal used to provide machine instructions and/or data to a programmable processor.

To provide interaction with a user, the system and technique described herein may be implemented on a computer having a display device (e.g., CRT (cathode ray tube) or LCD (liquid crystal display) monitor) for displaying information to the user; and a keyboard and pointing device (e.g., mouse or trackball) through which the user can provide input to the computer. Other kinds of devices can also be used to provide interaction with the user; for example, the feedback provided to the user can be any form of sensory feedback (e.g., visual feedback, auditory feedback, or tactile feedback); and can be in any form (including acoustic input, voice input, or tactile input) to receive input from the user.

The system and technique described herein may be implemented on a computing system that includes back-end components (e.g., as a data server), or a computing system that includes middleware components (e.g., an application server), or a computing system that includes front-end components (e.g., a user computer having a graphical user interface or web browser through which a user may interact with implementations of the system and technique described herein), or a computing system that includes any combination of such backend components, middleware components, or front-end components. The components of the system may be interconnected by any form or medium of digital data communication (e.g., a communication network). Examples of communication networks include: Local Area Networks (LANs), Wide Area Networks (WANs), and the Internet.

A computer system can include a client and a server. The client and the server are generally remote from each other and usually interact through a communication network. The relationship between the client and the server arises by virtue of computer programs running on the respective computers and having a client-server relationship with each other.

With the method for configuring a candidate number of repetitions, the configuration parameter set related to candidate numbers of repetitions predefined in the specification or notified by the broadcasting channel is obtained, the configuration parameter set related to candidate numbers of repetitions includes at least one set of candidate numbers of repetitions, and the set of candidate numbers of repetitions is used to determine the number of repetitions of at least one random access channel. In this way, the number of repetitions of a random access channel is predefined in the specification or notified by the broadcasting channel. That is, the number of repetitions of the random access channel can be predefined before establishing the connection between the base station and the user terminal, which can effectively configure the number of repetitions of the random access channel, thus enhancing the coverage of the random access channel and meeting the high requirements of the Internet of Things business for transmission rate and delay.

It should be understood that steps may be reordered, added or deleted using various forms of flows shown above. For example, the steps described in the present disclosure can be executed in parallel, sequentially, or in different orders, as long as the desired results of the technical solutions disclosed in the present disclosure can be achieved, which is not limited herein.

In an embodiment, a method for configuring a candidate number of repetitions, performed by a base station, is provided. The method includes: obtaining a configuration parameter set related to candidate numbers of repetitions predefined in a specification or a broadcasting channel notification, wherein the configuration parameter set related to candidate numbers of repetitions comprises at least one set of candidate numbers of repetitions, and the set of candidate numbers of repetitions is used to determine a number of repetitions of at least one random access channel.

In an embodiment, the configuration parameter set related to candidate numbers of repetitions comprises a correspondence relation between the set of candidate numbers of repetitions and at least one of a user terminal type and a channel type.

In an embodiment, the method further includes: obtaining a type of a user terminal requesting access in response to the configuration parameter set related to candidate numbers of repetitions comprising a correspondence relation between the set of candidate numbers of repetitions and the user terminal type; obtaining a set of candidate numbers of repetitions corresponding to the type of the user terminal requesting access according to the configuration parameter set related to candidate numbers of repetitions; and configuring the set of candidate numbers of repetitions obtained as a target set of candidate numbers of repetitions corresponding to the random access channel.

In an embodiment, the method further includes: obtaining a set of candidate numbers of repetitions corresponding to the random access channel according to the configuration parameter set related to candidate numbers of repetitions in response to the configuration parameter set related to candidate numbers of repetitions comprising a correspondence relation between the set of candidate numbers of repetitions and the channel type; and configuring the set of candidate numbers of repetitions obtained as a target set of candidate numbers of repetitions corresponding to the random access channel.

In an embodiment, the method further includes: obtaining a type of a user terminal requesting access in response to the configuration parameter set related to candidate numbers of repetitions comprising a correspondence relation between the user terminal type, the channel type, and the set of candidate numbers of repetitions; obtaining a set of candidate numbers of repetitions corresponding to the type of the user terminal requesting access and the random access channel according to the configuration parameter set related to candidate numbers of repetitions; and configuring the set of candidate numbers of repetitions obtained as a target set of candidate numbers of repetitions corresponding to the random access channel.

In an embodiment, obtaining the type of the user terminal requesting access comprises: obtaining the type of the user terminal requesting access according to a received first random access signaling.

In an embodiment, the method further includes: in response to determining to perform set switch, switching a target set of candidate numbers of repetitions corresponding to a third random access channel and/or a fourth random access channel to another set of candidate numbers of repetitions in the configuration parameter set related to candidate numbers of repetitions.

In an embodiment, determining to perform set switch comprises: determining to perform set switch according to a reception power of a random access preamble in a received first random access signaling.

In an embodiment, the method further includes: sending a second random access signaling through a second random access channel, wherein the second random access signaling comprises a switch indication, and the switch indication is used to indicate to perform set switch.

In an embodiment, a method for configuring a candidate number of repetitions, performed by a base station, is provided. The method includes: obtaining an access resource on which a user terminal requesting access sends a first random access signaling; obtaining a set of candidate numbers of repetitions corresponding to the access resource according to a predefined mapping relation table between access resources and sets of candidate numbers of repetitions; and configuring the set of candidate numbers of repetitions obtained as a target set of candidate numbers of repetitions corresponding to at least one random access channel.

In an embodiment, the method further includes: in response to determining to perform set switch, switching a target set of candidate numbers of repetitions corresponding to a third random access channel and/or a fourth random access channel to another set of candidate numbers of repetitions in the mapping relation table.

In an embodiment, determining to perform set switch comprises: determining to perform the set switch according to a reception power of a random access preamble in a received first random access signaling.

In an embodiment, the method further includes: sending a second random access signaling through a second random access channel, wherein the second random access signaling comprises a switch indication, and the switch indication is used to indicate to perform set switch.

In an embodiment, a method for configuring a candidate number of repetitions, performed by a user terminal, is provided. The method includes: obtaining a configuration parameter set related to candidate numbers of repetitions predefined in a specification or a broadcasting channel notification, wherein the configuration parameter set related to candidate numbers of repetitions comprises at least one set of candidate numbers of repetitions, and the set of candidate numbers of repetitions is used to determine a number of repetitions of at least one random access channel.

In an embodiment, the configuration parameter set related to candidate numbers of repetitions comprises a correspondence relation between the set of candidate numbers of repetitions and at least one of a user terminal type and a channel type.

In an embodiment, the method further includes: obtaining a set of candidate numbers of repetitions corresponding to a type of the user terminal according to the configuration parameter set related to candidate numbers of repetitions in response to the configuration parameter set related to candidate numbers of repetitions comprising a correspondence relation between the set of candidate numbers of repetitions and the user terminal type; and configuring the set of candidate numbers of repetitions obtained as a target set of candidate numbers of repetitions corresponding to the random access channel.

In an embodiment, the method further includes: obtaining a set of candidate numbers of repetitions corresponding to the random access channel according to the configuration parameter set related to candidate numbers of repetitions in response to the configuration parameter set related to candidate numbers of repetitions comprising a correspondence relation between the set of candidate numbers of repetitions and the channel type; and configuring the set of candidate numbers of repetitions obtained as a target set of candidate numbers of repetitions corresponding to the random access channel.

In an embodiment, the method further includes: obtaining a set of candidate numbers of repetitions corresponding to a type of the user terminal and the random access channel according to the configuration parameter set related to candidate numbers of repetitions in response to the configuration parameter set related to candidate numbers of repetitions comprising a correspondence relation between the user terminal type, the channel type, and the set of candidate numbers of repetitions; and configuring the set of candidate numbers of repetitions obtained as a target set of candidate numbers of repetitions corresponding to the random access channel.

In an embodiment, the method further includes: switching a target set of candidate numbers of repetitions corresponding to a third random access channel and/or a fourth random access channel to another set of candidate numbers of repetitions in the configuration parameter set related to candidate numbers of repetitions according to a switch indication in a received second random access signaling.

In an embodiment, a method for configuring a candidate number of repetitions, performed by a user terminal, is provided. The method includes: obtaining a measurement value of a reference signal receiving power of the user terminal; determining a measurement range corresponding to the measurement value; obtaining a set of candidate numbers of repetitions corresponding to the measurement range according to a predefined mapping relation table between measurement ranges and sets of candidate numbers of repetitions; and configuring the set of candidate numbers of repetitions obtained as a target set of candidate numbers of repetitions corresponding to a random access channel.

In an embodiment, the method further includes: switching a target set of candidate numbers of repetitions corresponding to a third random access channel and/or a fourth random access channel to another set of candidate numbers of repetitions in the mapping relation table according to a switch indication in a received second random access signaling.

In an embodiment, an apparatus for configuring a candidate number of repetitions, performed by a base station, is provided. The apparatus includes: a first obtaining module, configured to obtain a configuration parameter set related to candidate numbers of repetitions predefined in a specification or a broadcasting channel notification, wherein the configuration parameter set related to candidate numbers of repetitions comprises at least one set of candidate numbers of repetitions, and the set of candidate numbers of repetitions is used to determine a number of repetitions of at least one random access channel.

In an embodiment, an apparatus for configuring a candidate number of repetitions, performed by a base station, is provided. The apparatus includes: a second obtaining module, configured to obtain an access resource on which a user terminal requesting access sends a first random access signaling; a third obtaining module, configured to obtain a set of candidate numbers of repetitions corresponding to the access resource according to a predefined mapping relation table between access resources and sets of candidate numbers of repetitions; and a first configuring module, configured to configure the set of candidate numbers of repetitions obtained as a target set of candidate numbers of repetitions corresponding to at least one random access channel.

In an embodiment, an apparatus for configuring a candidate number of repetitions, performed by a user terminal, is provided. The apparatus includes: a fourth obtaining module, configured to obtain a configuration parameter set related to candidate numbers of repetitions predefined in a specification or a broadcasting channel notification, the configuration parameter set related to candidate numbers of repetitions comprises at least one set of candidate numbers of repetitions, and the set of candidate numbers of repetitions is used to determine a number of repetitions of at least one random access channel.

In an embodiment, an apparatus for configuring a candidate number of repetitions, performed by a user terminal, is provided. The apparatus includes: a fifth obtaining module, configured to obtain a measurement value of a reference signal receiving power of the user terminal; a determining module, configured to determine a measurement range corresponding to the measurement value; a sixth obtaining module, configured to obtain a set of candidate numbers of repetitions corresponding to the measurement range according to a predefined mapping relation table between measurement ranges and sets of candidate numbers of repetitions; and a second configuring module, configured to configure the set of candidate numbers of repetitions obtained as a target set of candidate numbers of repetitions corresponding to a random access channel.

In an embodiment, a base station including the apparatus for configuring a candidate number of repetitions according any of the above embodiments is provided.

In an embodiment, a user terminal including the apparatus for configuring a candidate number of repetitions according any of the above embodiments is provided.

In an embodiment, an electronic device is provided. The electronic device includes: at least one processor; and a memory communicatively connected to the at least one processor. The memory has instructions executable by the at least one processor stored thereon that, when executed by the at least one processor, cause the at least one processor to be capable to perform the method for configuring a candidate number of repetitions according to any of the above embodiments.

In an embodiment, a computer-readable storage medium having computer instructions stored thereon is provided. The computer instructions are configured to cause a computer to perform the method for configuring a candidate number of repetitions according to any of the above embodiments.

What is claimed is:

1. A method for configuring a candidate number of repetitions, performed by a base station, comprising:

obtaining a configuration parameter set related to candidate numbers of repetitions predefined in a specification or notified by a broadcasting channel, wherein the configuration parameter set related to candidate numbers of repetitions comprises at least one set of candidate numbers of repetitions, and the set of candidate numbers of repetitions is used to determine a number of repetitions of at least one random access channel, wherein the configuration parameter set related to candidate numbers of repetitions comprises a correspondence relation between the set of candidate numbers of repetitions and at least one of a user terminal type and a channel type;

obtaining a type of a user terminal requesting access in response to the configuration parameter set related to candidate numbers of repetitions comprising a correspondence relation between the set of candidate numbers of repetitions and the user terminal type, obtaining a set of candidate numbers of repetitions corresponding to the type of the user terminal requesting access according to the configuration parameter set related to candidate numbers of repetitions, and configuring the set of candidate numbers of repetitions obtained as a target set of candidate numbers of repetitions corresponding to the at least one random access channel; or obtaining a type of a user terminal requesting access in response to the configuration parameter set related to candidate numbers of repetitions comprising a correspondence relation between the user terminal type, the channel type, and the set of candidate numbers of repetitions, obtaining a set of candidate numbers of repetitions corresponding to the type of the user terminal requesting access and the at least one random access channel according to the configuration parameter set related to candidate numbers of repetitions, and configuring the set of candidate numbers of repetitions obtained as a target set of candidate numbers of repetitions corresponding to the at least one random access channel.

2. The method of claim 1, further comprising:

obtaining a set of candidate numbers of repetitions corresponding to the at least one random access channel according to the configuration parameter set related to candidate numbers of repetitions in response to the configuration parameter set related to candidate numbers of repetitions comprising a correspondence relation between the set of candidate numbers of repetitions and the channel type; and configuring the set of candidate numbers of repetitions obtained as a target set of candidate numbers of repetitions corresponding to the at least one random access channel.

3. The method of claim 2, further comprising:

in response to determining to perform set switch, switching a target set of candidate numbers of repetitions corresponding to a third random access channel and/or a fourth random access channel to another set of candidate numbers of repetitions in the configuration parameter set related to candidate numbers of repetitions.

4. The method of claim 3, wherein obtaining the type of the user terminal requesting access comprises:

obtaining the type of the user terminal requesting access according to a received first random access signaling.

5. The method of claim 3, further comprising:

in response to determining to perform set switch, switching a target set of candidate numbers of repetitions corresponding to a third random access channel and/or a fourth random access channel to another set of candidate numbers of repetitions in the configuration parameter set related to candidate numbers of repetitions.

6. The method of claim 5, wherein determining to perform set switch comprises:

determining to perform set switch according to a reception power of a random access preamble in a received first random access signaling.

7. The method of claim 5, further comprising:

sending a second random access signaling through a second random access channel, wherein the second random access signaling comprises a switch indication, and the switch indication is used to indicate to perform set switch.

8. The method of claim 1, wherein obtaining the type of the user terminal requesting access comprises:

obtaining the type of the user terminal requesting access according to a received first random access signaling.

9. The method of claim 1, further comprising:

in response to determining to perform set switch, switching a target set of candidate numbers of repetitions corresponding to a third random access channel and/or a fourth random access channel to another set of candidate numbers of repetitions in the configuration parameter set related to candidate numbers of repetitions.

10. A method for configuring a candidate number of repetitions, performed by a user terminal, comprising:

obtaining a configuration parameter set related to candidate numbers of repetitions predefined in a specification or notified by a broadcasting channel, wherein the configuration parameter set related to candidate numbers of repetitions comprises at least one set of candidate numbers of repetitions, and the set of candidate numbers of repetitions is used to determine a number of repetitions of at least one random access channel, wherein the configuration parameter set related to candidate numbers of repetitions comprises a correspondence relation between the set of candidate numbers of repetitions and at least one of a user terminal type and a channel type;

obtaining a set of candidate numbers of repetitions corresponding to a type of the user terminal according to the configuration parameter set related to candidate numbers of repetitions in response to the configuration parameter set related to candidate numbers of repetitions comprising a correspondence relation between the set of candidate numbers of repetitions and the user terminal type, and configuring the set of candidate numbers of repetitions obtained as a target set of candidate numbers of repetitions corresponding to the at least one random access channel, or obtaining a set of candidate numbers of repetitions corresponding to a type of the user terminal and the at least one random access channel according to the configuration parameter set related to candidate numbers of repetitions in response to the configuration parameter set related to candidate numbers of repetitions comprising a correspondence relation between the user terminal type, the channel type, and the set of candidate numbers of repetitions, and configuring the set of candidate numbers of repetitions obtained as a target set of candidate numbers of repetitions corresponding to the at least one random access channel.

11. The method of claim 10, further comprising:

obtaining a set of candidate numbers of repetitions corresponding to the at least one random access channel according to the configuration parameter set related to candidate numbers of repetitions in response to the configuration parameter set related to candidate numbers of repetitions comprising a correspondence relation between the set of candidate numbers of repetitions and the channel type; and configuring the set of candidate numbers of repetitions obtained as a target set of candidate numbers of repetitions corresponding to the at least one random access channel.

12. The method of claim 10, further comprising:

switching a target set of candidate numbers of repetitions corresponding to a third random access channel and/or a fourth random access channel to another set of candidate numbers of repetitions in the configuration parameter set related to candidate numbers of repetitions according to a switch indication in a received second random access signaling.

13. A base station, comprising:

at least one processor; and a memory communicatively connected to the at least one processor; wherein, the memory has instructions executable by the at least one processor stored thereon that, when executed by the at least one processor, cause the at least one processor to perform a method for configuring a candidate number of repetitions, the method comprising:

obtaining a configuration parameter set related to candidate numbers of repetitions predefined in a specification or notified by a broadcasting channel, wherein the configuration parameter set related to candidate numbers of repetitions comprises at least one set of candidate numbers of repetitions, and the set of candidate numbers of repetitions is used to determine a number of repetitions of at least one random access channel, wherein the configuration parameter set related to candidate numbers of repetitions comprises a correspondence relation between the set of candidate numbers of repetitions and at least one of a user terminal type and a channel type;

obtaining a type of a user terminal requesting access in response to the configuration parameter set related to candidate numbers of repetitions comprising a correspondence relation between the set of candidate numbers of repetitions and the user terminal type, obtaining a set of candidate numbers of repetitions corresponding to the type of the user terminal requesting access according to the configuration parameter set related to candidate numbers of repetitions, and configuring the set of candidate numbers of repetitions obtained as a target set of candidate numbers of repetitions corresponding to the at least one random access channel; or obtaining a type of a user terminal requesting access in response to the configuration parameter set related to candidate numbers of repetitions comprising a correspondence relation between the user terminal type, the channel type, and the set of candidate numbers of repetitions, obtaining a set of candidate numbers of repetitions corresponding to the type of the user terminal requesting access and the at least one random access channel according to the configuration parameter set related to candidate numbers of repetitions, and configuring the set of candidate numbers of repetitions obtained as a target set of candidate numbers of repetitions corresponding to the at least one random access channel.

14. A user terminal, comprising:

at least one processor; and a memory communicatively connected to the at least one processor; wherein, the memory has instructions executable by the at least one processor stored thereon that, when executed by the at least one processor, cause the at least one processor to perform a method for configuring the candidate number of repetitions of claim 10.

* * * * *